UNITED STATES PATENT OFFICE.

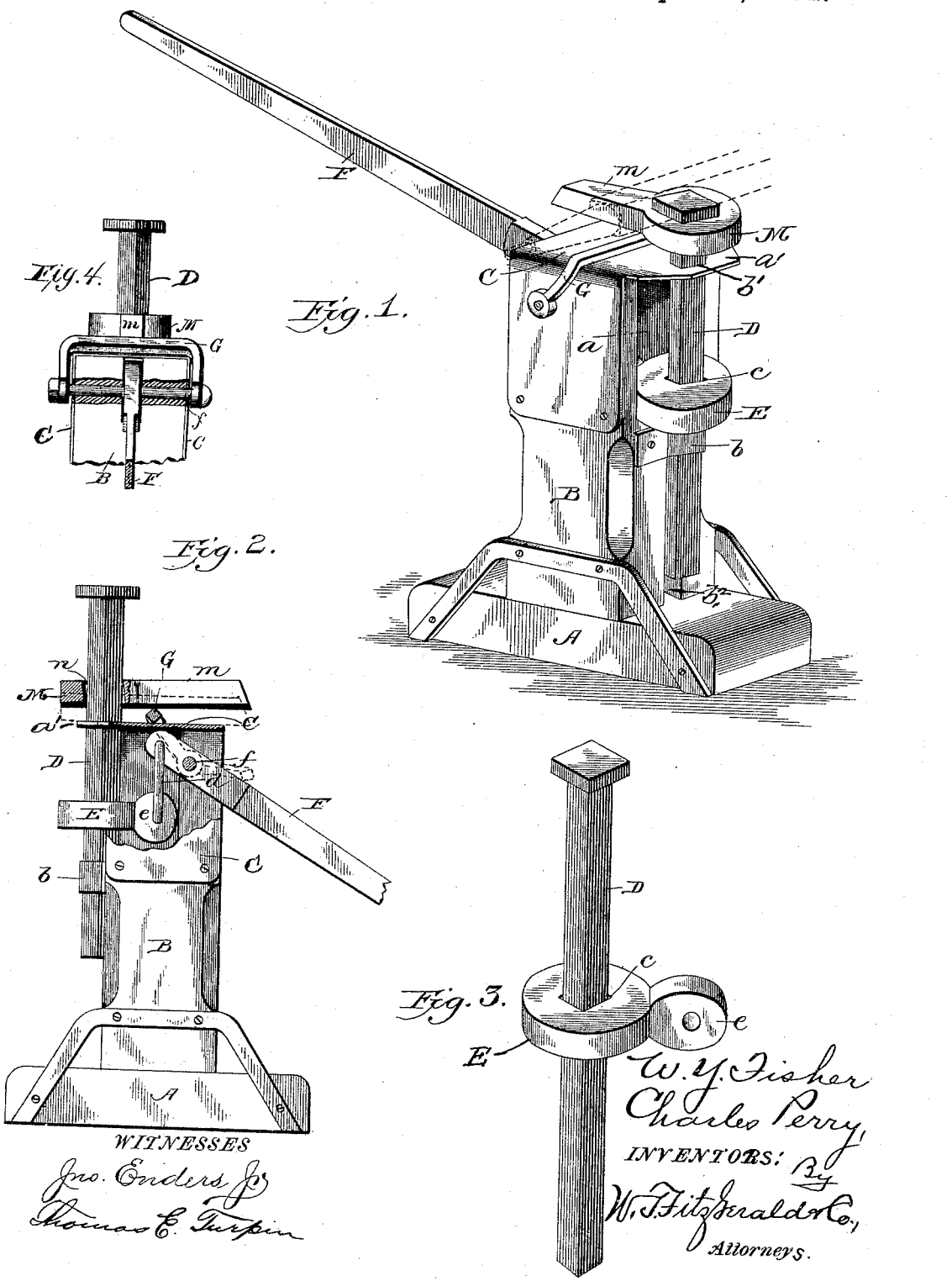

WILLIAM Y. FISHER AND CHARLES PERRY, OF BIG TIMBER, MONTANA.

LIFTING-JACK.

SPECIFICATION forming part of Letters Patent No. 482,628, dated September 13, 1892.

Application filed April 29, 1892. Serial No. 431,184. (No model.)

*To all whom it may concern:*

Be it known that we, WILLIAM Y. FISHER and CHARLES PERRY, citizens of the United States, residing at Big Timber, in the county of Park and State of Montana, have invented certain new and useful Improvements in Lifting-Jacks; and we do hereby declare the following to be a full, clear, and exact description of the invention, such as will enable others skilled in the art to which it appertains to make and use the same.

Our invention has relation to improvements in lifting-jacks; and it has for its object to provide a jack of a cheap, simple, and durable construction and one embodying but few parts, through the medium of which a powerful leverage may be exercised and a heavy load raised and sustained.

With the foregoing end in view the novelty of the invention will be fully understood from the following description and claim, when taken in conjunction with the accompanying drawings, in which—

Figure 1 is a perspective view of our improved jack, the parts being illustrated in a position to lift a weight when the lever is reciprocated. Fig. 2 is a side elevation of the same with part of the housing broken away and showing the holding-dog and bail in position for holding the lifting-bar against downward movement, also showing in dotted lines the position of the holding-dog and bail to permit the lifting-bar to drop. Fig. 3 is a detail perspective view of the lifting-bar and the bar-raising dog connected together. Fig. 4 is a top sectional view of the lifting-jack, showing the bail pivoted to the bolt of the lever.

In the said drawings similar letters designate corresponding parts throughout the several views. Referring to which, A indicates the base-block of our improved jack, and B indicates the standard, which is connected to the base-block and is preferably braced, as shown. This standard B, which is preferably formed from wood, has its upper end slotted or bifurcated, as shown at $a$, to afford play-space for some of the movable parts, and the upper end of the said slot $a$ is closed by a cap-plate C, which is preferably formed from sheet metal and connected to the top and sides of the standards, as shown. This cap-piece is provided with an extension $a'$, having an opening $b'$ for the passage of the lifting-bar D. Said bar also engages a strap $b$ and slides in a recess $b^2$, formed in the rear portion of the standard. E indicates the dog through the medium of which said bar is raised. This dog E is provided with an aperture $c$, as shown, for the passage of the lifting-bar, which aperture is of such a size that while it will permit a free passage of the lifting-bar while the dog rests upon the lower wall of the slot $a$ or other support and will permit the dog to move downward upon the said lifting-bar its walls will bind upon and raise the lifting-bar when the dog is raised.

Connected by a link $d$ to the rearwardly-extending branch $e$ of the lifting-dog E is the inner end of the operating-lever F, which is fulcrumed upon a transverse bolt $f$ between the side walls of the slot $a$ and is reciprocated in a vertical plane to raise the lifting-bar D.

Pivotally connected to the sides of the cap-piece C, on the outer ends of the bolt $f$, on which the lever F is mounted, is a bail G, which is designed and adapted to be thrown up, so that its transverse portion will rest upon the cap-plate C and support the rearwardly-extending branch $m$ of the holding-dog M, so as to pitch the forward portion of said dog slightly downward and cause the walls of its aperture $n$ to bind upon the lifting-bar. This aperture $n$ is of such a size that while its walls will bind upon and sustain the lifting-bar when the dog is pitched slightly downwardly they will allow a free passage of said bar when the dog rests in a horizontal plane.

In operation when it is desired to raise the lifting-bar the bail G is thrown up over the cap C, and the rearwardly-extending branch $m$ of the dog M is placed upon said bail so as to pitch the forward portion of said dog slightly downward. The operating-lever is then reciprocated to reciprocate the dog E, which will bind upon the lifting-bar upon its upward movement, but will slide freely upon said bar upon its downward movement. As the lifting-bar is moved upward it will raise the forward portion of the dog M to a horizontal position and the lifting-bar will slide freely through the aperture therein; but as soon as the upward movement of the lifting-bar ceases the forward portion of the said dog M will fall slightly and bind upon and prevent a downward movement of the lifting-bar. When it is desired to lower the lifting-bar, the bail G is swung off of the cap C and the free end of the operating-lever is raised, so that the dogs E and M will rest in horizontal planes upon the bottom wall of the slot a and the cap C, respectively, as shown in Fig. 2, when the lifting-bar will slide freely through the apertures of the said dogs.

Having thus described our invention, what we claim, and desire to secure by Letters Patent, is—

A lifting-jack consisting of the base A, having mounted thereon the standard B, having the recess $b^2$ formed in the front portion thereof, the strap b, spanning said recess, the cap-piece C, inclosing the top and upper side portions of the standard and having an extension a', with opening b', the lifting-bar D, adapted to slide in said opening, strap, and recess and provided with the dogs E M, the latter having branch m, the bail G, and lever F, pivoted to bolt f, said lever having a link d connected to a branch e of dog E, all combined and arranged to operate as and for the purposes specified.

In testimony whereof we affix our signatures in presence of two witnesses.

WM. Y. FISHER.
CHARLES PERRY.

Witnesses:
THOS. K. LEE,
JOHN H. BAKER.